United States Patent
Haberman

(10) Patent No.: US 8,948,728 B2
(45) Date of Patent: Feb. 3, 2015

(54) METHOD AND APPARATUS FOR USING A CELLULAR NETWORK TO FACILITATE ACCESS BY A MOBILE DEVICE TO A LOCAL WIRELESS ACCESS POINT

(75) Inventor: Ron E. Haberman, Sunnyvale, CA (US)

(73) Assignee: Alcatel Lucent, Boulogne Billancourt (FR)

(*) Notice: Subject to any disclaimer, the term of this patent is extended or adjusted under 35 U.S.C. 154(b) by 229 days.

(21) Appl. No.: 13/163,118

(22) Filed: Jun. 17, 2011

(65) Prior Publication Data

US 2012/0322407 A1  Dec. 20, 2012

(51) Int. Cl.
*H04M 1/66* (2006.01)
*H04W 12/08* (2009.01)
*H04W 84/12* (2009.01)

(52) U.S. Cl.
CPC .............. *H04W 12/08* (2013.01); *H04W 84/12* (2013.01)
USPC .......................................... 455/411; 455/406

(58) Field of Classification Search
None
See application file for complete search history.

(56) References Cited

U.S. PATENT DOCUMENTS

| | | | | |
|---|---|---|---|---|
| 2004/0053599 A1* | 3/2004 | Karaoguz et al. | | 455/408 |
| 2004/0152447 A1* | 8/2004 | McDonnell et al. | | 455/411 |
| 2006/0236378 A1* | 10/2006 | Burshan | | 726/4 |
| 2007/0171881 A1 | 7/2007 | Zhang et al. | | |
| 2008/0192698 A1 | 8/2008 | Rue | | |
| 2009/0034471 A1 | 2/2009 | Rosenblatt | | |
| 2010/0048165 A1* | 2/2010 | Caldwell et al. | | 455/406 |
| 2011/0081890 A1* | 4/2011 | Ahmadvand et al. | | 455/411 |
| 2011/0223965 A1* | 9/2011 | Miklos et al. | | 455/525 |

\* cited by examiner

*Primary Examiner* — Suhail Khan
(74) *Attorney, Agent, or Firm* — Wall & Tong LLP

(57) ABSTRACT

A local wireless access capability is disclosed. A mobile device (MD) receives cellular service from a cellular service provider and is also configured to be able to access local wireless access points (LWAPs) of respective wireless hotspots. The MD detects one or more LWAPs. The MD determines access point information associated with each detected LWAP. The MD propagates the access point information toward a service provider controller (SPC) of the cellular service provider. The SPC determines, for each of one or more of the one or more detected LWAPs, whether the MD is authorized to access the LWAP. The SPC determines whether the MD is authorized to access an LWAP using the service information of the cellular service provider and the access point information associated with the LWAP. The SPC identifies one of the LWAPs to be accessed by the MD. The SPC provides credential data for the LWAP either to the MD (such that the MD may provide the credential information to the LWAP to access the LWAP) or to the LWAP (on behalf of the MD for authenticating the MD to the LWAP). The MD may then access the selected LWAP.

21 Claims, 6 Drawing Sheets

METHOD AND APPARATUS FOR USING A CELLULAR NETWORK TO FACILITATE ACCESS BY A MOBILE DEVICE TO A LOCAL WIRELESS ACCESS POINT

TECHNICAL FIELD

The invention relates generally to communication networks and, more specifically but not exclusively, wireless communication networks.

BACKGROUND

As mobile devices become more advanced, many mobile devices are being implemented as dual-mode devices configured to support cellular wireless access (e.g., via Third Generation (3G) cellular networks, Fourth Generation (4G) cellular networks, and the like) and local wireless access (e.g., via Wireless Fidelity (WiFi) hotspot networks).

SUMMARY

Various deficiencies in the prior art are addressed by embodiments for using a cellular network to facilitate access by a mobile device to a local wireless access point.

In one embodiment, an apparatus includes a processor and a memory, where the processor is configured to receive, at a network element of a cellular service provider from a mobile device, information associated with a local wireless access point detected by the mobile device, and determine, using service information of the cellular service provider and the information associated with the local wireless access point detected by the mobile device, whether the mobile device is authorized to access the local wireless access point. In one embodiment, a method includes receiving, at a network element of a cellular service provider from a mobile device, information associated with a local wireless access point detected by the mobile device, and determining, using service information of the cellular service provider and the information associated with the local wireless access point detected by the mobile device, whether the mobile device is authorized to access the local wireless access point.

In one embodiment, an apparatus includes a processor and a memory, where the processor is configured to propagate, from a mobile device toward a network element of a cellular service provider, information associated with a local wireless access point detected by the mobile device, and receive, from the network element of the cellular service provider, an indication as to whether the mobile device is authorized to access the detected local wireless access point. In one embodiment, a method includes propagating, from a mobile device toward a network element of a cellular service provider, information associated with a local wireless access point detected by the mobile device, and receiving, from the network element of the cellular service provider, an indication as to whether the mobile device is authorized to access the detected local wireless access point.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

In general, a local wireless access capability is depicted and described herein, although various other capabilities also may be presented herein.

In at least some embodiments, the local wireless access capability enables a mobile device to access a local wireless access point via interaction by the mobile device with a cellular network of a service provider.

In at least some embodiments, the local wireless access capability at least partially automates access by a mobile device to a local wireless access point. In this manner, a user is able to access a local wireless access point with little or no manual intervention required (e.g., obviating the need for the user to scan a list of local wireless access points in order to identify which of the local wireless access points the user is or may be authorized to access, obviating the need for the user to manually enter credentials in a login screen of a wireless access point in order to be authenticate by the wireless access point and access the local wireless access point, and the like).

In at least some embodiments, the local wireless access capability enables handoff of the mobile device between two wireless technologies (e.g., from a cellular wireless network to a local wireless access point). In at least some embodiments, the local wireless network capability enables handoff of a mobile device from the cellular network to the local wireless access point within the context of an active session (e.g., a Hypertext Transfer Protocol (HTTP) session, a call session, a media session, and the like).

Although primarily depicted and described herein with respect to embodiments in a mobile device accesses a wireless hotspot using the local wireless access capability, it is noted that a mobile device may access any other suitable type of local wireless network using the local wireless access capability.

Figure 1:
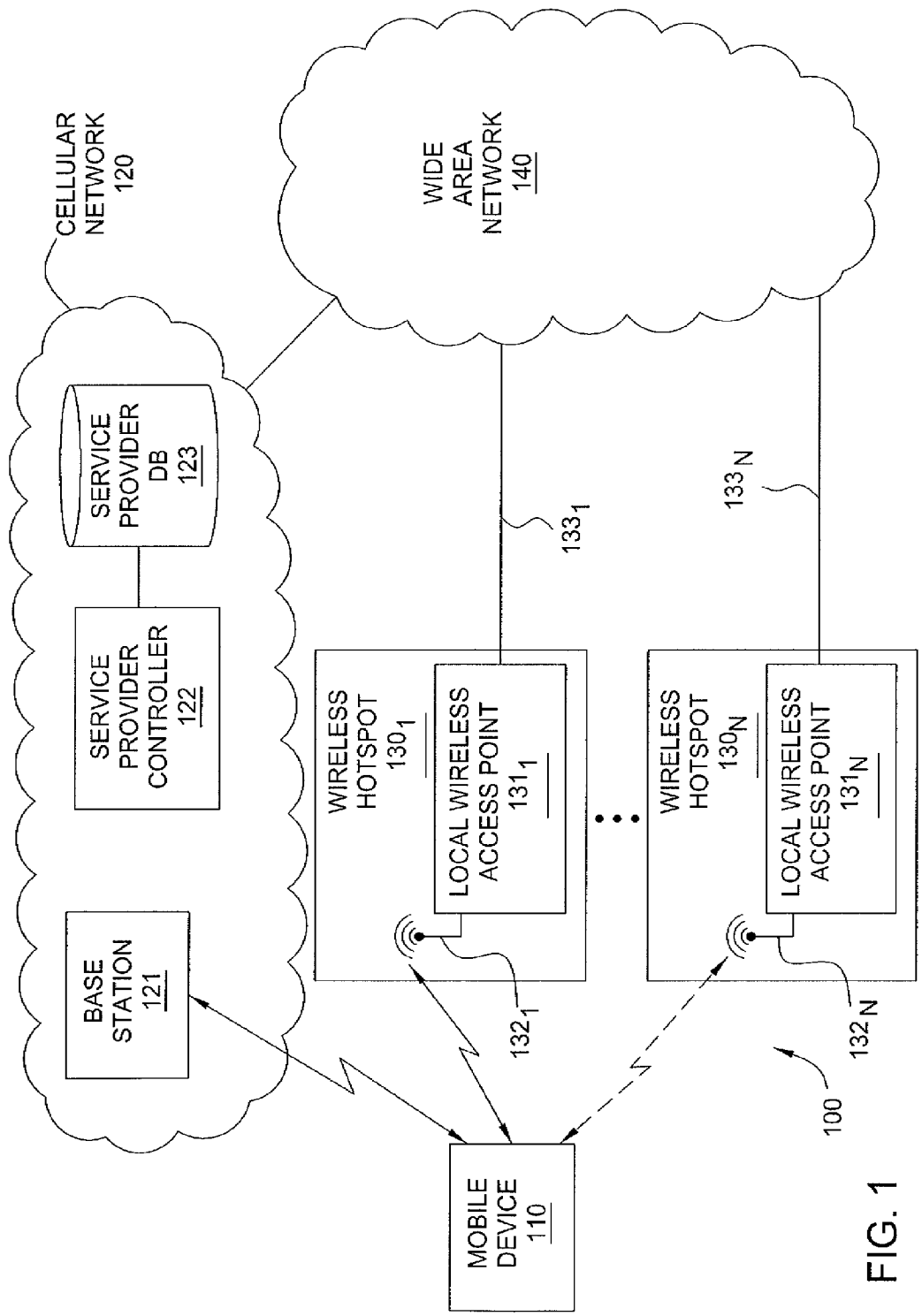
FIG. 1 depicts an exemplary communication system illustrating use of a cellular network to facilitate access by a mobile device to a local wireless access point of a wireless hotspot.

FIG. 1 depicts an exemplary communication system illustrating use of a cellular network to automate access by a mobile device to a local wireless access point of a wireless hotspot.

As depicted in FIG. 1, exemplary communication system 100 includes a mobile device (MD) 110, a cellular network (CN) 120, a plurality of wireless hotspots (WHs) $130_1$-$130_N$ (collectively, WHs 130), and a wide area network (WAN 140).

The MD 110 may be any mobile device configured to communicate using both cellular wireless communications (e.g., via Third Generation (3G) cellular networks, Fourth Generation (4G) cellular networks, and the like) and local wireless communications (e.g., using one or more of Wireless Fidelity (WiFi) networks, Worldwide Interoperability for Microwave Access (WiMAX) networks, and the like). For example, the MD 110 may be a laptop computer, a tablet computer, a smart phone, or any other similar device.

The CN 120 may be any suitable type of cellular network, such as a 3G network, a 4G network, and the like. The CN 120 is operated by a cellular service provider.

The CN 120 provides cellular wireless service to mobile devices and, thus, includes a communications infrastructure for supporting wireless access by the mobile devices and for supporting communications between the mobile devices and WAN 140. For example, as depicted in FIG. 1, CN 120 includes a base station (BS) 121 which is a cellular wireless access point via which the MD 110 may access CN 120. The CN 120 also includes other network elements that provide additional communications infrastructure for CN 120 (e.g., other base stations, radio network controllers, routers and other backhaul elements, policy and charging servers, and the like, as well as various combinations thereof), which are omitted for purposes of clarity. In one embodiment, CN 120 is configured to support communications of one or more of the WHs 130.

The CN 120 includes one or more network elements configured to provide various functions of the local wireless access capability. For example, as depicted in FIG. 1, CN 120 includes a service provider controller (SPC) 122 that is configured to provide various functions of the local wireless access capability. The CN 120 is configured to support communications between BS 121 and SPC 122, such that MD 110 may communicate with SPC 122 via BS 121 for providing various functions of the local wireless access capability. The CN 120 also may be configured to support communications between SPC 122 and WHs 130 (e.g., directly, or indirectly via WAN 140 and/or any other suitable network), such that SPC 122 may communicate with one or more of the WHs 130 for providing various functions of the local wireless access capability.

The WHs 130 provide local wireless access locations for MDs, for enabling MDs to access WAN 140. For example, the WHs 130 are generally located in public locations, such as airports, hotels, restaurants, coffee shops, bookstores, parks, and various other locations.

The WHs $130_1$-$130_N$ include a plurality of local wireless access points (LWAPs) $131_1$-$131_N$ (collectively, LWAPs 131), respectively, each of which is configured to provide wireless access for MDs and backhaul to WAN 140, thereby enabling MDs to access WAN 140.

The LWAPs $131_1$-$131_N$ include a plurality of antennas $132_1$-$132_N$ (collectively, antennas 132), respectively, supporting respective local wireless access areas which are geographic areas within which MDs may potentially establish wireless connections to the respective wireless access points $131_1$-$131_N$. As noted hereinabove, the LWAPs 131 may utilize any suitable local wireless access technologies which may be used to provide WHs 130 (e.g., one or more of WiFi, WiMAX, and the like).

The LWAPs $131_1$-$131_N$ also support a plurality of backhaul connections $133_1$-$133_N$ (collectively, backhaul connections 133) configured to support communications between LWAPs $131_1$-$131_N$ and WAN 140, respectively. The backhaul connections 133 may be provided using any suitable type or types of backhaul networks and technologies (e.g., cable, Digital Subscriber Line (DSL), optical, wireless, and the like).

In general, a LWAP 131 is configured to support a security mechanism, whereby a MD (e.g., MD 110) that is attempting to access the LWAP 131 is required to enter access credentials in order to access LWAP 131 and, thus, in order to gain access for communication with WAN 140. The credentials may include any types of credentials suitable for use in controlling access to a local wireless access point (e.g., login and password, local wireless access point identifier and password, and the like). The use of such credentials to access an LWAP 131 is described in additional detail hereinbelow.

The WAN 140 may include any suitable wire area network which may be accessed via cellular wireless and local wireless technologies, such as the Internet, a private WAN, and the like, as well as various combinations thereof.

In general, a WH 130 is owned and/or controlled by a wireless hotspot proprietor. The wireless hotspot proprietor for a WH 130 may be the proprietor of the location at which the WH 130 is located, a wireless hotspot operator which owns the WH 130 or controls/operates the WH 130 on behalf of the proprietor of the location at which the WH 130 is located, and the like. The wireless hotspot proprietor for a WH 130 may control the scope of access to the WH 130 (e.g., providing free wireless access to some or all users, charging some or all users for wireless access, and the like, as well as various combinations thereof).

In general, a wireless hotspot proprietor of a WH(s) 130 may enter into one or more service agreements with one or more service providers for the WH(s) 130. The service providers may include wireline service providers, wireless service providers (including cellular service providers), service providers supporting wireline and wireless service, and the like, as well as various combinations thereof.

The service agreement between a proprietor and a service provider may be specified for a single WH 130, for a group of WHs 130, and the like, as well as various combinations thereof. Additionally, a proprietor may enter into service agreements with multiple service providers.

For example, a proprietor of a single coffee shop, having a WH 130, may enter into a service agreement with a service provider to provide customers of the service provider with access to its WH 130. For example, a proprietor of three coffee shop locations, each having a WH 130, may enter into a service agreement with a service provider to provide customers of the service provider with access to its WHs 130 at each of those three coffee shop locations. For example, Coffee Shop Corporation (e.g., providing a large number of coffee shop franchises) may enter into a service agreement with a service provider such that all customers of the service provider may access WHs 130 at all Coffee Shop Corporation coffee shop locations. For example, a proprietor of a single coffee shop, having a WH 130, may (1) enter into a first service agreement with a first service provider to provide customers of the first service provider with access to its WH 130 according to the first service agreement (e.g., free access to the WH 130) and (2) may enter into a second service agreement with a second service provider to provide customers of the second service provider with access to its WH 130 according to the second service agreement (e.g., access to the WH 130 at a rate of $X per minute).

The service agreement between a proprietor and a service provider for a WH(s) 130 may define the scope and conditions of access to the WH(s) 130 by the customers of the service provider, which may be based on one or more factors (e.g., status of the user as a current customer of the service provider, the type of MD being used by the customer, and the like, as well as various combinations thereof).

For example, the service agreement may specify that all customers of the service provider may access the WH 130 for free, that all customers of the service provider will be charged in order to access the WH 130, and the like, as well as various combinations thereof. Similarly, for example, the service agreement may specify that all customers of the service provider that are using iPads may access the WH 130 for free, and that all other customers of the service provider will be charged in order to access the WH 130, and the like, as well as various combinations thereof. It is noted that fewer or more, as well as different, conditions may be used to define one or more classes of service provider customers and the associated scope and conditions of access to the WH 130 by those service provider customers.

The service agreement between a proprietor and a service provider for a WH(s) 130 may include or be complemented by one or more Service Level Agreements (SLAs) defining the level of service to be provided to MDs that access the WH(s) 130.

The service agreement between a proprietor and a service provider for a WH 130 also may specify the credentials required from a MD in order for the MD to gain access to the WH 130 of the proprietor (e.g., login and password, or any other suitable type(s) of credentials). It is noted that such credential information does not need to be included as part of the service agreement, and may instead be logically associated with the service agreement in any suitable manner.

As described herein, the SPC 122 is configured to provide various functions of the local wireless access capability.

The SPC 122 has access to service information, and is configured to use the service information to facilitate authentication of MDs (e.g., MD 110) at WHs 130.

In one embodiment, the service information of the cellular service provider of CN 120 includes information related to service agreements between the cellular service provider of CN 120 and various proprietors of WHs 130. In one embodiment, for example, the service information includes information for each WH 130/LWAP 131 for which the cellular service provider has an associated service agreement with the proprietor of the WH 130. For example, the service information for a given WH 130/LWAP 131 may include a network identifier associated with the LWAP 131, an LWAP identifier of the LWAP 131, access pricing information for the LWAP 131 (e.g., access is free, access is provided at a rate of $X/minute, access is provided at a rate of $X/day, and the like), credentials for access to the LWAP 131 (e.g., login/password and/or any other suitable credentials), and the like, as well as various combinations thereof. The service information for a given WH 130/LWAP 131 may include any other information suitable for use in providing various functions of the local wireless access capability as depicted and described herein.

In one embodiment, the service information of the cellular service provider of CN 120 includes information related to one or more service agreements between users of MDs which are subscribers of the cellular service provider (e.g., the user of MD 110) and one or more proprietors of one or more of the WHs 130. For example, the service information may include a list of WHs 130/LWAPs 131 which the user of the MD is authorized to access, which may include information such as, for each WAP 130/LWAP 131, a network identifier associated with the LWAP 131, an LWAP identifier of the LWAP 131, credentials for access to the LWAP 131 (e.g., login/password and/or any other suitable credentials), and the like, as well as various combinations thereof.

In one embodiment, the service information of the cellular service provider of CN 120 includes information related various combinations of such service agreements, e.g., service agreements between the cellular service provider and proprietors of WHs 130, service agreements between users of MDs (which are subscribers of the cellular service provider) and proprietors of WHs 130, and the like.

The service information of the cellular service provider of CN 120 may include any other suitable types of service information.

It is noted that some or all of the service information of the cellular service provider of CN 120 also may be referred to herein as service agreement information.

The service information of the cellular service provider of CN 120 may be maintained in any suitable manner. For example, service information of the cellular service provider of CN 120 may be maintained in any suitable location(s) (e.g., as a service provider database (SPD) 123 which forms part of or is otherwise accessible to SPC 122). For example, service information of the cellular service provider of CN 120 may be maintained in any suitable format.

Figure 2:
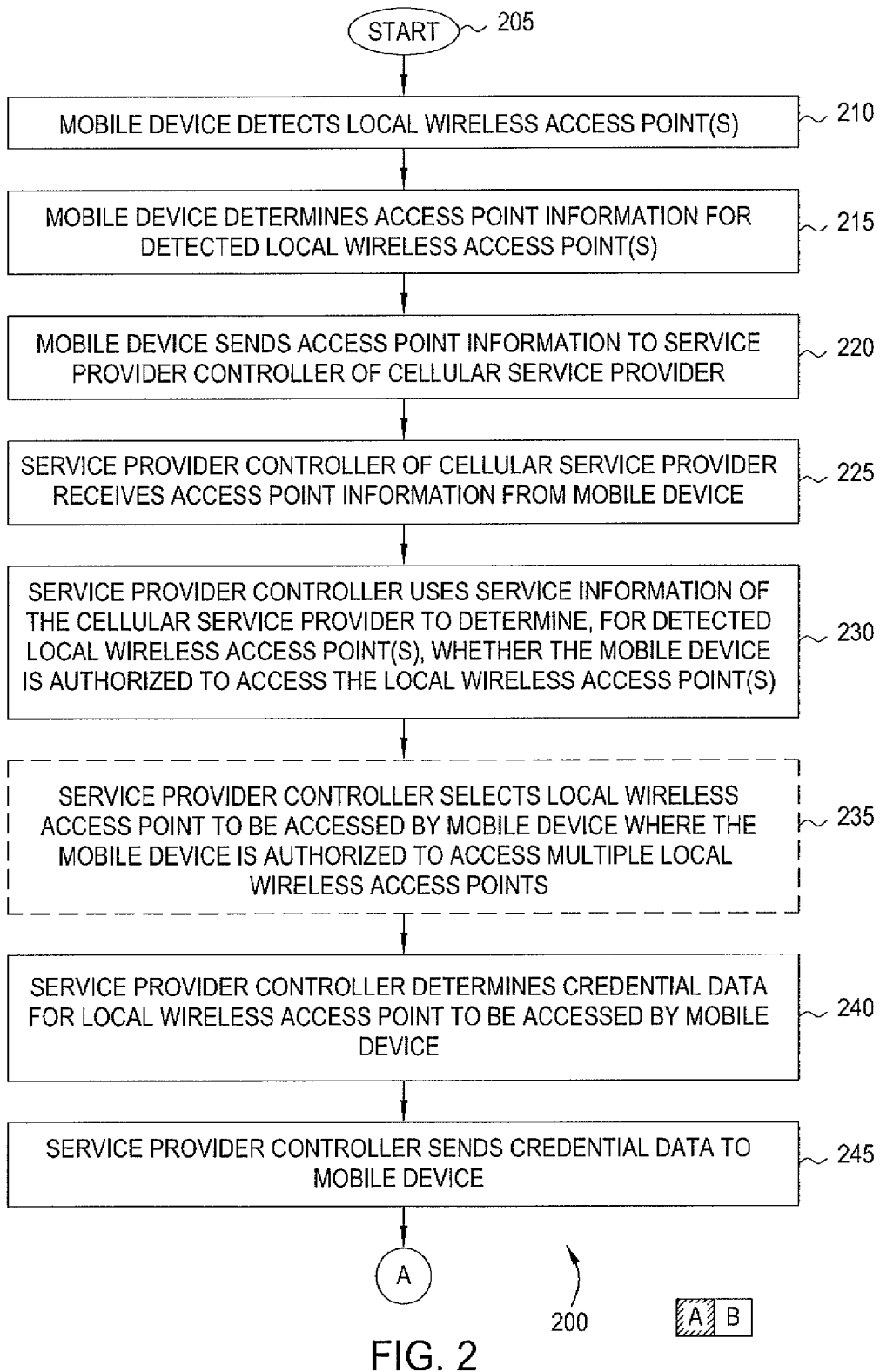
FIG. 2 depicts one embodiment of a method for using a cellular network to enable a mobile device to access a wireless hotspot, in which the mobile device interacts with the wireless hotspot for accessing the wireless hotspot.
Figure 2:
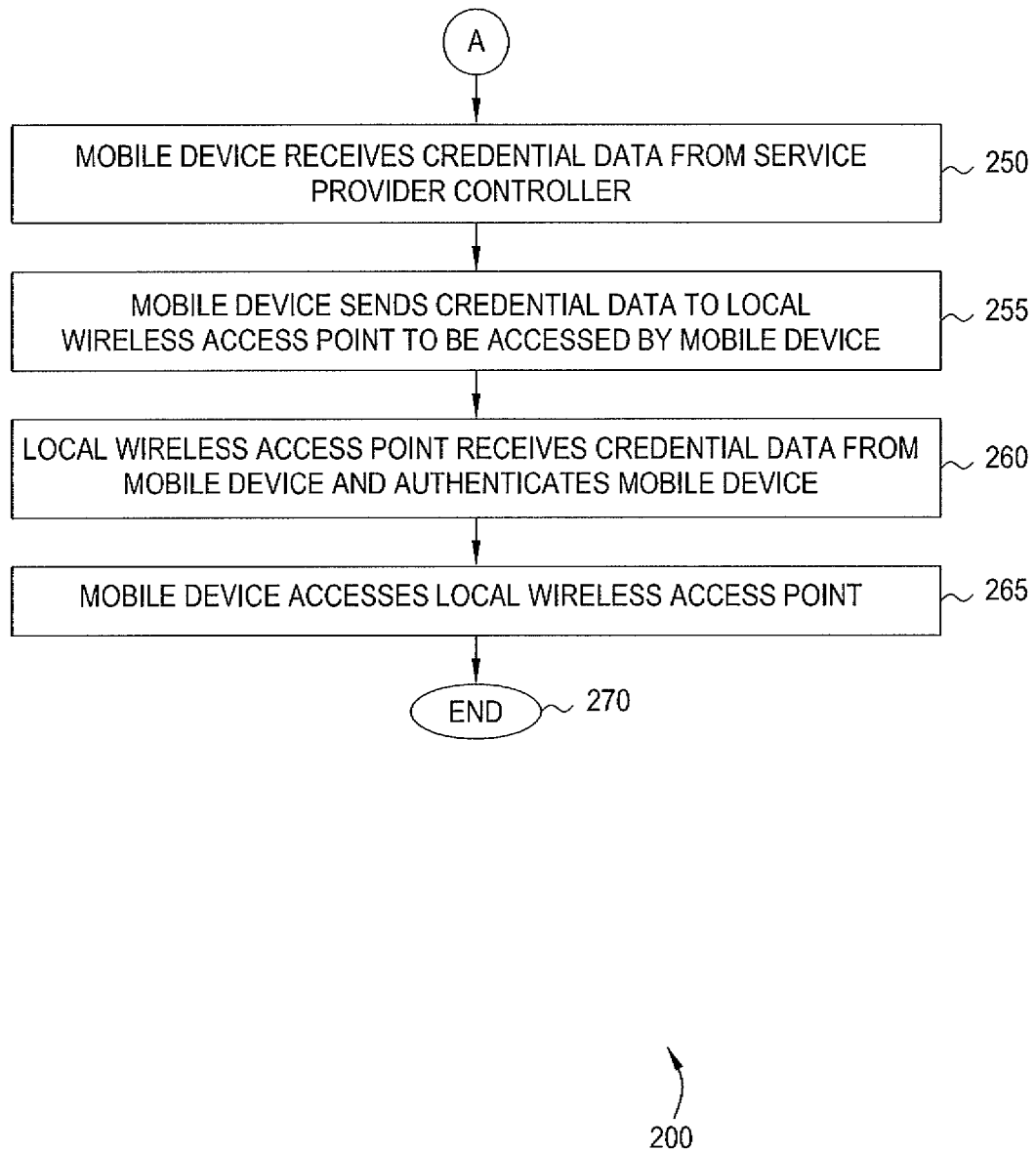
Figure 3:
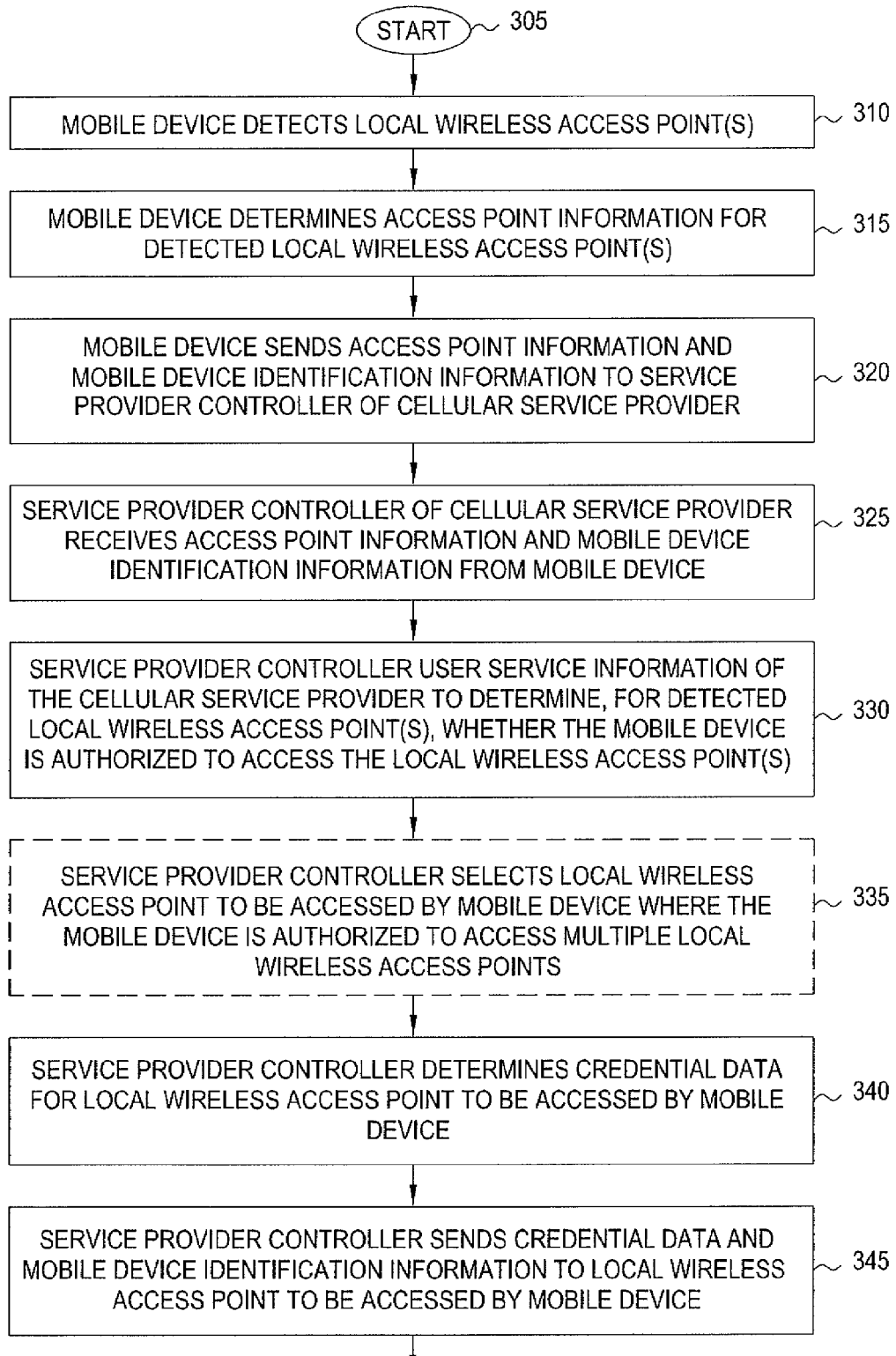
FIG. 3 depicts one embodiment of a method for using a cellular network to enable a mobile device to access a wireless hotspot, in which the cellular network interacts with the wireless hotspot for enabling the mobile device to access the wireless hotspot.
Figure 3:
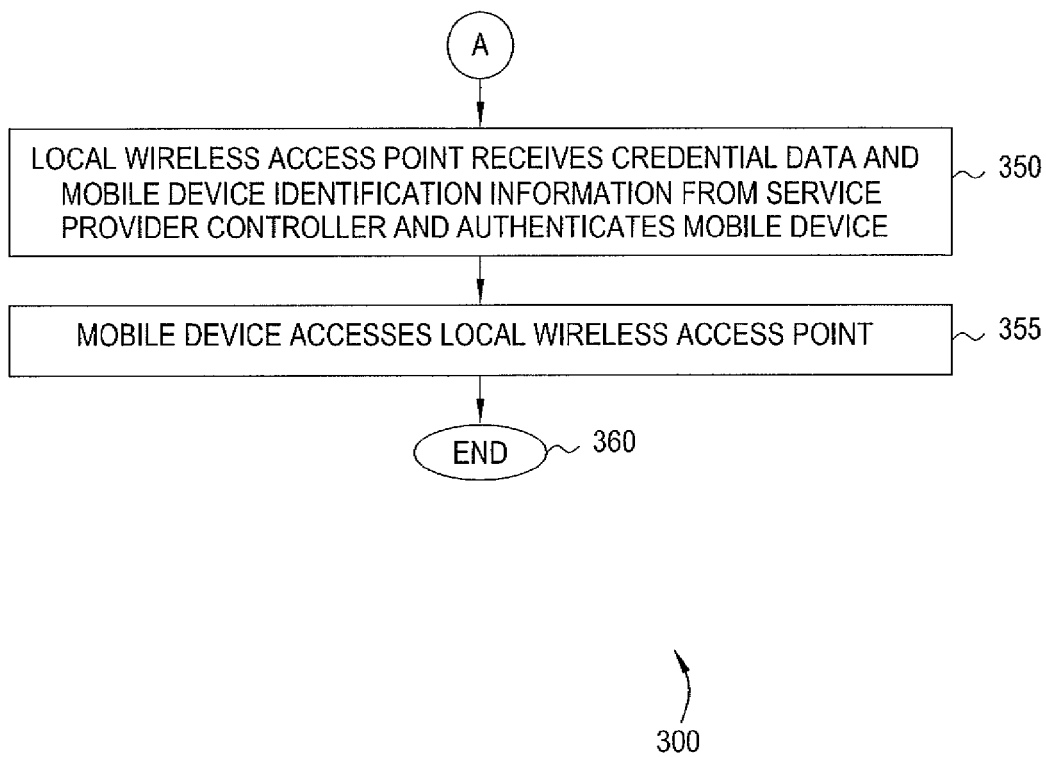

The use of service information of a cellular service provider to facilitate authentication of MDs at WHs may be better understood with respect to the embodiments depicted and described with respect to FIGS. 2 and 3.

FIG. 2 depicts one embodiment of a method for using a cellular network to enable a mobile device to access a wireless hotspot, in which the mobile device interacts with the wireless hotspot for accessing the wireless hotspot. Although the steps of method 200 are depicted and described as being performed serially, it is noted that the steps of method 200 may be performed contemporaneously and/or in a different order than presented.

At step 205, method 200 begins.

At step 210, the MD detects one or more LWAPs of one or more associated WHs. The MD detects a LWAP by detecting wireless signals from the LWAP. It is noted that the detection of a LWAP of a WH also may be considered to be detection of the WH.

At step 215, the MD determines access point information for each of the one or more detected LWAPs. The access point information includes, for each detected LWAP, access point information associated with the detected LWAP. In one embodiment, the access point information associated with a detected LWAP includes a network identifier of the LWAP and an LWAP identifier of the detected LWAP. In one embodiment, the access point information associated with a detected LWAP may further include signal strength information associated with the detected LWAP. In one embodiment, in which the MD detects multiple LWAPs, the access point information also may include a ranking of the detected LWAPs in an order of selection preference, which may be determined by the MD automatically and/or based on input from a user of the MD.

At step 220, the MD sends the access point information to the SPC of the cellular service provider. The MD transmits the access point information to the SPC of the cellular service provider via the CN of the cellular service provider.

At step 225, the SPC of the cellular service provider receives the access point information.

At step 230, the SPC of the cellular service provider determines, for each of the one or more detected LWAPs, whether the MD is authorized to access the detected LWAP.

In the case in which only a single LWAP is detected by the MD, the SPC determines whether or not the MD is authorized to access that single LWAP.

In the case in which multiple LWAPs are detected by the MD, the SPC determines, for one or more of the multiple LWAPs, whether or not the MD is authorized to access the LWAP(s). In one embodiment, for example, the SPC performs the determination for each of the detected LWAPs. In one embodiment, for example (e.g., where the MD specifies a preference order of the LWAPs), the SPC may perform the determination by considering each of the multiple LWAPs serially, based on the preference order received from the MD, until finding the most preferred of the detected LWAPs that the MD is authorized to access (e.g., which may be the first LWAP for which the determination is performed, the last LWAP for which the determination is performed, or even none of the detected WHs).

The SPC determines whether the MD is authorized to access a detected LWAP using the access point information received for the detected LWAP and the service information of the cellular service provider.

The SPC may use the access point information received for the detected LWAP and the service information of the cellular service provider, to determine whether or not the MD is authorized to access the associated LWAP, in any suitable manner.

In one embodiment, for example, the SPC uses at least a portion of the access point information for the LWAP (e.g., the LWAP identifier of the LWAP and, optionally, the network identifier associated with the LWAP) as a key(s) to search service information of the cellular service provider. For example, the SPC may search the service information in order to determine if the cellular service provider has a service agreement with the proprietor of the LWAP and/or whether the user of the MD has a service agreement with the proprietor of the LWAP. In one embodiment, the existence of a service agreement for the LWAP may be sufficient for the SPC to determine that the MD is authorized to access the LWAP. In one embodiment, the existence of a service agreement for the LWAP may not be sufficient for the SPC to determine that the MD is authorized to access the LWAP, in which case the SPC may retrieve and evaluate details of an existing service agreement (if identified) in order to determine whether the MD is authorized to access the LWAP.

As indicated in FIG. 2, depending on the number of LWAPs detected by the MD, the SPC may determine that the MD is authorized to access one or more LWAPs.

In one embodiment, in which the MD is only authorized to access one LWAP, method 200 proceeds directly to step 240 (skipping optional step 235), at which point the SPC proceeds to facilitate access to the selected LWAP by the MD.

In one embodiment, in which the MD is authorized to access multiple LWAPs, method 200 proceeds to optional step 235 (before proceeding to step 240).

At optional step 235, the SPC selects one of the multiple LWAPs on behalf of the MD and then proceeds to step 240, at which point the SPC proceeds to facilitate access to the selected LWAP by the MD. The SPC may select one of the multiple LWAPs using any suitable information (e.g., based on one or more of a preference order of LWAPs received from the MD in conjunction with the access point information, signal strength information received from the MD in conjunction with the access point information, some or all of the service information used by the SPC to perform authorization determinations, pricing information indicative of the cost required to access each of the multiple LWAPs, and the like, as well as various combinations thereof).

At step 240, the SPC determines credential data for the LWAP to be accessed by the MD (e.g., the only LWAP that the MD is authorized to access or the selected one of the multiple LWAPs that the MD is authorized to access). The SPC may determine the credential data in any suitable manner. For example, the SPC may determine the credential data locally and/or remotely. For example, the SPC may determine the credential data for a LWAP from the service information associated with the LWAP (e.g., where the credential data is maintained as part of the service data), using some or all of the access point information associated with the LWAP (e.g., one or more of the network identifier, the LWAP identifier, and the like) to retrieve the credential data where the credential data is maintained separate from the service information, and the like, as well as various combinations thereof.

At step 245, the SPC sends the credential data, for the LWAP to be accessed by the MD, to the MD. The SPC may send the credential data in any suitable form. In one embodiment, the credential data is sent as a log-in packet or message that includes the credential data. The SPC sends the credential data to the MD via the CN of the cellular service provider.

At step 250, the MD receives the credential data for the select LWAP from the SPC. The MD may then use the credential data to authenticate itself with the LWAP.

At step 255, the MD sends the credential data to the LWAP. The MD may provide the credential data to the LWAP in any suitable manner.

In one embodiment, in which the credential data is provided, by the SPC to the MD, in the form of a log-in packet or message, the MD propagates the log-in packet or message toward the selected LWAP for authenticating itself with the selected LWAP.

In one embodiment, the MD automatic populates a login screen of the LWAP using the credential data and submits the credential data to the LWAP for authenticating itself with the selected LWAP.

At step 260, the selected LWAP receives the credential data from the MD and authenticates the MD. The MD may then access the selected LWAP.

At step 265, the MD accesses the LWAP. The MD is then able to communicate with any network(s) accessible via the LWAP (e.g., the Internet, a private data network, and the like).

At step 270, method 200 ends.

Although primarily depicted and described herein with respect to an embodiment in which the SPC selects the LWAP to be used by the MD on behalf of the MD, in at least one other embodiment the selection of the LWAP to be used by the MD may be performed by the MD or by a combination of the MD and the SPC.

In one embodiment, for example, when the MD detects multiple WHs, the MD may select one or more of the detected LWAPs as being the subset of detected LWAP(s) for which the MD will provide associated access point information to the SPC for evaluation by the SPC.

In various embodiments, this selection by the MD may be performed before and/or after the MD determines the access point information (i.e., step 215).

In one embodiment, for example, the MD may select one or more of the detected LWAPs before determining the access point information for the detected LWAP(s) (e.g., based on local information stored on the MD (e.g., from previous interactions by the MD with the LWAP and/or interactions by the SPC regarding the LWAP), randomly, and the like).

In one embodiment, for example, the MD may select one or more of the detected LWAPs after determining the access point information for the detected LWAPs, where selection of the one or more of the detected LWAPs may be performed by the MD using one or more of access point information associated with the detected LWAPs (e.g., signal strength information or any other suitable information), other information associated with the detected LWAPs (e.g., WH proprietor information for the LWAPs, wireless technology type information for the LWAPs, and the like), and the like, as well as various combinations thereof.

As noted above, the MD also may use various combinations of such embodiments to select one or more of the detected LWAPs as an LWAP(s) for which the MD will provide associated access point information to the SPC for evaluation. As an example, where a combination of such embodiments is used, the MD may initially detect four LWAPs, initially select two of the four LWAPs based on local information available at the MD, determine access point information for the two selected LWAPs, select one of the two LWAPs based on the access point information determined for the two LWAPs, and then provide the access point information for the selected LWAP to the SPC. Similarly, as an example, where a combination of such embodiments is used, the MD may initially detect five LWAPs, initially select three of the five LWAPs based on initial access point information determined by the MN via interaction with the detected LWAPs, determine access point information for the three selected LWAPs, select two of the three LWAPs based on the access point information determined for the three LWAPs, and then provide the access point information for the two LWAPs to the SPC. It is noted that the foregoing examples are merely a few of the permutations of the various combinations of such embodiments which may be used to select one or more of the detected LWAPs as an LWAP(s) for which the MD will provide associated access point information to the SPC for evaluation.

In at least some such embodiments, in which the MD selects one or more of the detected LWAPs as an LWAP(s) for which the MD will provide access point information to the SPC for evaluation, when the MD selects multiple LWAPs and provides access point information of the multiple selected LWAPs to the SPC, the access point information also may include a ranking of the multiple selected LWAPs in an order of selection preference (e.g., which may be determined by the MD automatically and/or based on input from a user of the MD). As noted herein, this may enable the SPC to perform processing of the access point information in a priority order such that the SPC may be able to select the most-preferred LWAP that the MD is authorized to access while tending to reduce consumption of resources.

In at least some such embodiments, the MD and SPC may participate in multiple iterations of information exchange whereby the MD participates in selection of one of the detected LWAPs to be accessed by the MD.

In one embodiment, in which the MD detects multiple LWAPs but only provides access point information for a selected subset of the detected LWAPs to SPC for evaluation, the SPC may determine that the MD is not authorized to access any of the subset of selected LWAPs and may reply to the MD with an indication of this result. In this case, in a second iteration, the MD may then select one or more of the other previously detected LWAPs (i.e., detected LWAPs that were not previously selected by the MD) and provide access point information for the other LWAP(s) to the SPC for evaluation. In this case, the SPC will again perform evaluation for the newly selected LWAP(s) and reply to the MD with an indication of the result of the evaluation. This may provide the MD with another opportunity to access a LWAP without requiring the MD to provide access point information for all detected LWAPs in the first iteration (and, optionally, without having to even determine the access point information for all of the detected LWAPs in the first iteration) and without requiring the SPC to evaluate access point information for all detected LWAPs in the first iteration.

In one embodiment, in which the MD detects multiple LWAPs but only provides access point information for a selected subset of the detected LWAPs to SPC for evaluation, the SPC may determine that the MD is authorized to access one or more of the selected LWAPs and may reply to the MD with an indication of this result. In this case, there may be one or more reasons why the MD may prefer one of the other previously detected LWAPs (i.e., detected WHs that were not previously selected by the MD) to the LWAP(s) that the MD is authorized to access as reported by the SPC. For example, such reasons may include changes in signal strength, changes in cost of using the LWAP, and the like. In this case, in a second iteration, the MD may then (e.g., prior to and/or contemporaneous with the MD attempting to access the LWAP (or one of the LWAPs) that the MD is authorized to access as reported by the SPC in the first iteration), select one or more of the other previously detected LWAPs (i.e., detected LWAPs that were not previously selected by the MD) and provide access point information for the LWAP(s) to the SPC for evaluation. In this case, the SPC will again perform evaluation for the newly selected LWAP(s) and reply to the MD with an indication of the result of the evaluation. In this case, if the MD is not authorized to access any of the newly-selected detected LWAPs provided to the SPC in the second iteration, the MD may then attempt to access or continue accessing and/or using one of the LWAPs reported by the SPC during the first iteration as being accessible to the MD. In this case, if the MD is authorized to access one or more of the newly-selected detected LWAPs provided to the SPC in the second iteration, the MD then select one of the multiple available LWAPs (i.e., from among the one or more reported during the first iteration as being accessible to the MD and the one or more reported during the second iteration as being accessible to the MD) and attempt to access the selected LWAP.

In one embodiment, for example, when the MD detects multiple LWAPs, the SPC may select one or more of the detected LWAPs, on behalf of the MD, as an LWAP (s) to be accessed by the MD. In one embodiment, for example, when MD detects multiple LWAPs and the SPC determines that the MD is authorized to access multiple detected LWAPs, the SPC may respond to the MD with information identifying each of the multiple detected LWAPs that the MD is authorized to access. In one such embodiment, the SPC sends credential data for each of the multiple detected LWAPs that the MD is authorized to access, such that the MD can select one of the multiple LWAPs and then initiate a process for accessing the selected one of the multiple LWAPs. In another such embodiment, the SPC does not send credential data for each of the multiple detected LWAPs that the MD is authorized to access, in which case, after the MD selects one of the multiple LWAPs that it is authorized to access, the MD signals an indication of its selection to the SPC which then responds by providing the credential data for the selected one of the LWAPs to the MD such that the MD can then initiate a process for accessing the selected one of the multiple LWAPs.

It is noted that various combinations of such embodiments (e.g., where both the MD and the SPC are actively involved in selecting among multiple WHs within the context of determining the LWAP that is ultimately accessed by the MD) may be used for enabling the MD to access one of the detected LWAPs.

FIG. 3 depicts one embodiment of a method for using a cellular network to enable a mobile device to access a wireless hotspot, in which the cellular network interacts with the wireless hotspot for enabling the mobile device to access the wireless hotspot. Although the steps of method 300 are depicted and described as being performed serially, it is noted that the steps of method 300 may be performed contemporaneously and/or in a different order than presented.

At step 305, method 300 begins.

As depicted, the steps 310-340 are substantially similar to the steps 210-240, with a few differences. For example, in steps 320 and 325, in addition to providing the access point information to the SPC, the MD also provides MD identification information to the SPC for enabling the SPC to communicate, on behalf of the MD, with an LWAP to be accessed by the MD (e.g., for providing credential data to the LWAP on behalf of the MD). The MD identification information may include any suitable identifier and/or other type of information which may be used by SPC to communicate with an LWAP to be accessed by the MD. In one embodiment, for example, MD identification information of the MD is an address of the MD (e.g., its Media Access Control (MAC) address and/or any other suitable type of address).

At step 345, the SPC sends, to the LWAP to be accessed by the MD, credential data for the LWAP to be accessed by the MD and the MD identification information of the MD, such that the LWAP may authenticate the MD without requiring the MD to provide the credential data to the LWAP directly. The SPC may send the credential data and the MD identification information in any suitable form. In one embodiment, the credential data and the MD identification information are sent together as part of a log-in packet or message. The SPC may provide the credential data and the MD identification information to the LWAP to be accessed by the MD in any other suitable manner.

At step 350, the selected LWAP receives the credential data and the MD identification information from the SPC and authenticates the MD. The MD may then access the selected LWAP.

At step 355, the MD accesses the LWAP. The MD is then able to communicate with any network(s) accessible via the LWAP (e.g., the Internet, a private data network, and the like).

At step 360, method 300 ends.

Although primarily depicted and described herein with respect to an embodiment in which the SPC selects the LWAP to be used by the MD on behalf of the MD, in at least one other embodiment the selection of the LWAP to be used by the MD may be performed by the MD or by a combination of the MD and the SPC. It is noted that many such embodiments depicted and described herein in conjunction with the description of method 200 of FIG. 2 also may be used within the context of method 300 of FIG. 3. For example, the MD may perform an initial selection of one or more of the detected LWAPs and provide the access point information for the selected LWAP(s) to the SPC for use by the SPC in method 300 of FIG. 3 for selecting one of the LWAPs to be accessed by the MD. For example, the MD may provide access point information for each detected LWAP to the SPC, the SPC may determine that the MD is authorized to access more than one of the detected LWAPs and may provide an indication of such to the MD, the MD may select one of the multiple LWAPs that the MD is authorized to access and signal an indication of the selection to the SPC, and the SPC may then send credential data for the selected LWAP to the selected LWAP on behalf of the MD. It is noted that, in such embodiments, any suitable number of iterations of interaction between the MD and SPC may be used for enabling the SPC to determine the one of the detected LWAPs for which the SPC will provide the credential data on behalf of the MD.

As noted above, methods 200 and 300 of FIGS. 2 and 3 may be modified in a number of ways in order to provide various embodiments of the local wireless access capability. Additionally, one or more other embodiments also may be used in combination with method 200 of FIG. 2 and/or method 300 of FIG. 3.

In at least some embodiments, for example, the MD stores at least a portion of the information that it learns via interaction with LWAPs and/or with the SPC during initial and/or subsequent execution of processes via which the MD may gain access to LWAPs (e.g., LWAP technology type information, LWAP access pricing information, credential data, and the like, as well as various combinations thereof). In one such embodiment, during a subsequent attempt to access a WH, the MD may determine whether information stored locally at the MD is sufficient to enable the MD to access a LWAP without interaction with the SPC. In this embodiment, if the information is sufficient, the MD may use the information stored locally at the MD to access one of LWAPs. In this embodiment, if the information is insufficient, the MD may then initiate a process for using SPC to access a LWAP (e.g., such as method 200 of FIG. 2 or method 300 of FIG. 3, and/or any other suitable variations as depicted and described herein).

In at least some embodiments, for example, although depicted and described herein with respect to embodiments in which the MD ultimately accesses only a single LWAP at a time, the MD may access multiple LWAPs at a time. In one embodiment, for example, the MD may be configured to use the best available LWAP, which may include switching between the multiple LWAPs in response to one or more conditions (e.g., as signal conditions change, as LWAP pricing changes over time, and the like, as well as various combinations thereof). In one embodiment, for example, the MD may bind traffic streams of multiple LWAPs to increase its available bandwidth. It is noted that combinations of such embodiments also may be used. It is further noted that at least some such embodiments may be used irrespective of the manner in which the MD accesses the multiple LWAPs (e.g., where the MD provides credential data to one or more of the multiple LWAPs, where the SPC provides credential data to one or more of the multiple LWAPs on behalf of the MD, and the like, as well as various combinations thereof).

Figure 4:
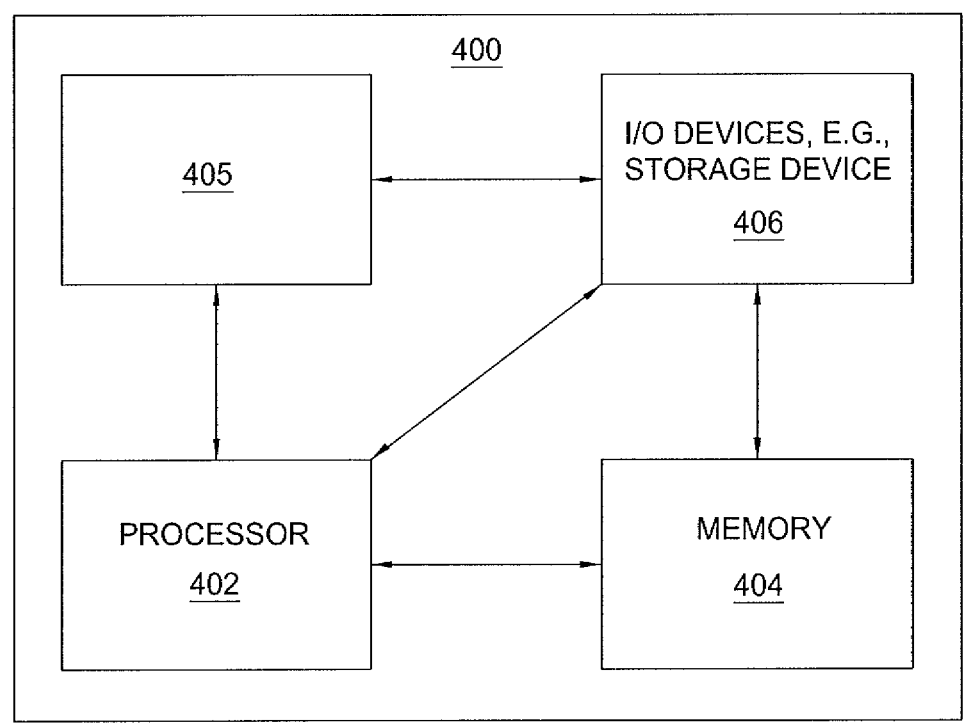
FIG. 4 depicts a high-level block diagram of a computer suitable for use in performing the functions described herein.

FIG. 4 depicts a high-level block diagram of a computer suitable for use in performing functions described herein.

As depicted in FIG. 4, computer 400 includes a processor element 402 (e.g., a central processing unit (CPU) and/or other suitable processor(s)) and a memory 404 (e.g., random access memory (RAM), read only memory (ROM), and the like). The computer 400 also may include a cooperating module/process 405 and/or various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 405 can be loaded into memory 404 and executed by processor 402 to implement functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of MD 110, BS 121, SPC 122, and WAP 131.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
obtain, at a cellular communication network of a cellular service provider, service information of the cellular service provider, wherein the service information of the cellular service provider comprises information associated with at least one service agreement of the cellular service provider, wherein the information associated with at least one service agreement of the cellular service provider comprises information associated with a service agreement between a user of a mobile device and a proprietor of a local wireless access point;
receive, from the mobile device via the cellular communication network based on detection of the local wireless access point by the mobile device, information associated with the local wireless access point; and
determine, based on the information associated with the local wireless access point and based on the information associated with the service agreement between the user of the mobile device and the proprietor of the local wireless access point, whether the mobile device is authorized to access the local wireless access point.

2. The apparatus of claim 1, wherein the information associated with the local wireless access point comprises:
a network identifier of a network associated with the local wireless access point; and
a local wireless access point identifier of the local wireless access point.

3. The apparatus of claim 1, wherein the information associated with the local wireless access point comprises a signal strength of the local wireless access point as measured by the mobile device.

4. The apparatus of claim 1, wherein the information associated with at least one service agreement of the cellular service provider further comprises:
information associated with a service agreement between the cellular service provider and the proprietor of the local wireless access point.

5. The apparatus of claim 4, wherein the processor is configured to determine whether the mobile device is authorized to access the local wireless access point based on the service agreement between the cellular service provider and the proprietor of the local wireless access point.

6. The apparatus of claim 1, wherein the processor is configured to:
propagate, toward the mobile device, an indication as to whether or not the mobile device is authorized to access the local wireless access point.

7. The apparatus of claim 1, wherein the processor is configured to:
based on a determination that the mobile device is authorized to access the local wireless access point, determine credential data associated with the local wireless access point.

8. The apparatus of claim 1, wherein the processor is configured to:
based on a determination that the mobile device is authorized to access the local wireless access point, propagate credential data toward the mobile device for use by the mobile device to access the local wireless access point.

9. The apparatus of claim 8, wherein the credential data is propagated as a login packet configured for being provided from the mobile device to the local wireless access point for enabling the mobile device to be authenticated by the local wireless access point.

10. The apparatus of claim 1, wherein the processor is configured to:
propagate, toward the local wireless access point, a message indicative that the mobile device is authorized to access the local wireless access point.

11. The apparatus of claim 10, wherein the message comprises credential data associated with the local wireless access point and a mobile device address of the mobile device.

12. The apparatus of claim 11, wherein the processor is configured to:
receive the mobile device address of the mobile device with the access point information received from the mobile device.

13. The apparatus of claim 1, wherein the local wireless access point is one of a plurality of local wireless access points detected by the mobile device, wherein the processor is configured to:
receive access point information associated with each of the plurality of local wireless access points detected by the mobile device; and
for each of the plurality of detected local wireless access points:
determine, using the service information of the cellular service provider and the respective access point information associated with the local wireless access point, whether the mobile device is authorized to access the respective local wireless access point.

14. The apparatus of claim 13, wherein the processor is configured to:
based on a determination that the mobile device is authorized to access multiple of the plurality of local wireless access points:
select one of the multiple local wireless access points; and
propagate an indication of the selected one of the local wireless access points toward the mobile device.

15. The apparatus of claim 14, wherein the indication of the selected one of the local wireless access points comprises credential data for use by mobile device in accessing the selected one of the local wireless access points.

16. The apparatus of claim 13, wherein the processor is configured to:

based on a determination that the mobile device is authorized to access multiple of the plurality of local wireless access points:
    select at least two of the multiple local wireless access points; and
    propagate information associated with each of the at least two selected local wireless access points toward the mobile device.

17. The apparatus of claim 16, wherein, for each of the at least two selected local wireless access points, the information associated with the local wireless access point comprises pricing information associated with access to the local wireless access point.

18. The apparatus of claim 1, wherein the information associated with at least one service agreement of the cellular service provider is maintained by the cellular service provider.

19. A method, comprising:
    using a processor and a memory for:
        obtaining, at a cellular communication network of a cellular service provider, service information of the cellular service provider, wherein the service information of the cellular service provider comprises information associated with at least one service agreement of the cellular service provider, wherein the information associated with at least one service agreement of the cellular service provider comprises information associated with a service agreement between a user of a mobile device and a proprietor of a local wireless access point;
        receiving, from the mobile device via the cellular communication network based on detection of the local wireless access point by the mobile device, information associated with the local wireless access point; and
        determining, based on the information associated with the local wireless access point and based on the information associated with the service agreement between the user of the mobile device and the proprietor of the local wireless access point, whether the mobile device is authorized to access the local wireless access point.

20. A mobile device, comprising:
    a processor and a memory communicatively connected to the processor, the processor configured to:
        propagate, from the mobile device toward a network element of a cellular communication network of a cellular service provider, information associated with a local wireless access point detected by the mobile device, wherein the information associated with the local wireless access point is propagated via the cellular communication network of the cellular service provider, wherein the network element of the cellular communication network is configured to obtain service information of the cellular service provider, the service information of the cellular service provider comprising information associated with at least one service agreement of the cellular service provider, wherein the information associated with at least one service agreement of the cellular service provider comprises information associated with a service agreement between a user of the mobile device and a proprietor of the detected local wireless access point; and
        receive, at the mobile device from the network element via the cellular communication network, an indication as to whether the mobile device is authorized to access the detected local wireless access point, the indication as to whether the mobile device is authorized to access the detected local wireless access point being determined based on the information associated with the local wireless access point and based on the information associated with the service agreement between the user of the mobile device and the proprietor of the detected local wireless access point.

21. A method, comprising:
    using a processor and a memory for:
        propagating, from a mobile device toward a network element of a cellular communication network of a cellular service provider, information associated with a local wireless access point detected by the mobile device, wherein the information associated with the local wireless access point is propagated via the cellular communication network of the cellular service provider, wherein the network element of the cellular communication network is configured to obtain service information of the cellular service provider, the service information of the cellular service provider comprising information associated with at least one service agreement of the cellular service provider, wherein the information associated with at least one service agreement of the cellular service provider comprises information associated with a service agreement between a user of the mobile device and a proprietor of the detected local wireless access point; and
        receiving, at the mobile device from the network element via the cellular communication network, an indication as to whether the mobile device is authorized to access the detected local wireless access point, the indication as to whether the mobile device is authorized to access the detected local wireless access point being determined based on the information associated with the local wireless access point and based on the information associated with the service agreement between the user of the mobile device and the proprietor of the detected local wireless access point.

* * * * *